Feb. 27, 1962   W. T. OHLHAUSEN   3,022,590
GROUND HINGED PICKET TYPE GATE
Filed July 5, 1960

WILLIAM T. OHLHAUSEN
INVENTOR.

BY *Herbert J. Brown*
ATTORNEY

United States Patent Office 3,022,590
Patented Feb. 27, 1962

3,022,590
GROUND HINGED PICKET TYPE GATE
William T. Ohlhausen, 8037 Downe Drive,
Fort Worth, Tex.
Filed July 5, 1960, Ser. No. 40,888
2 Claims. (Cl. 39—5)

This invention relates to gates and has reference to a fence portal adapted to restrain farm animals while permitting unobstructed entry and passage of automobiles, trucks and other self-powered vehicles.

With the obsolescence of horse drawn farm implements and vehicles the need for roadway gates to accommodate livestock and draft animals has greatly diminished on most farms. Simple hinged gates and wire gaps which once found great utility in rural areas now constitute inconveniences for farmers and their wives who use automobiles to avail themselves of centralized markets and community facilities. More than mere inconvenience is involved in circumstances which require a driver to stop his car, get out and open a gate, re-enter the car and drive through the gate, stop again, get out and close the gate then get in again and proceed to the next gate; the same automotive trend which has opened new vistas and opportunities to rural dwellers has exposed remote and secluded areas to the hazards of urban crime. Opening conventional gates after dark can be an invitation to robbery or other acts of violence.

Bump gates having entwined cable suspension about a central post permit a driver to gain access without leaving his automobile but may damage the body of the car if the driver miscalculates the force which the gate should be opened or the interval of time required for the gate to be urged by gravity to its closed position. Ground hinged gates, as presently known, may be kept erect by springs or counterweights and permit an automobile to depress and pass over the gate; in this type of structure the top of the gate tends to strike the bottom of the car in areas immediately behind its axles. Unfortunately, the gas tanks of many automobiles are located in a position to be struck by a ground hinged gate and, in addition, the trailer hitches carried by many farm vehicles tend to engage and damage the top of the gate. Bump gates, ground hinged gates, and similar structures generally have in common the provisions of a single and contiguous gate structure which is opened or depressed by an automobile. In order to withstand repeated contact with vehicles, gates of this type must be made of sturdy construction involving considerable weight and special subgrade foundations. The greater the weight of the hinged structure the greater is the force with which it may strike an automobile. Special construction to eliminate weight permits wind or farm animals themselves to open the gate.

Accordingly, an object of the present invention is to provide a fence portal having obstructions which permit the passage of an automobile therethrough but which do not subject an automobile to damaging contact with bodies of great weight.

Another object of the invention is to provide a gate comprised of a plurality of hinged members all of which need not be displaced to permit passage of an automobile.

A further object of the invention is to provide a picket type gate which may be depressed by a wheeled vehicle but which serves as an adequate barrier for farm animals.

Another object of the invention is to provide a ground hinged type gate which may be constructed without extensive sub-grade cavities or structures.

A further object of the invention is to provide a picket type ground hinged gate capable of restraining small animals during passage of an automobile therethrough.

An additional object of the invention is to provide a ground hinged gate comprised of a plurality of individually suspended members each of which is light in weight and which, together, tend to constrain farm animals even when partially depressed or displaced by wind action.

These and other objects will become apparent from the following description and the accompanying drawing, wherein.

Figure 4:
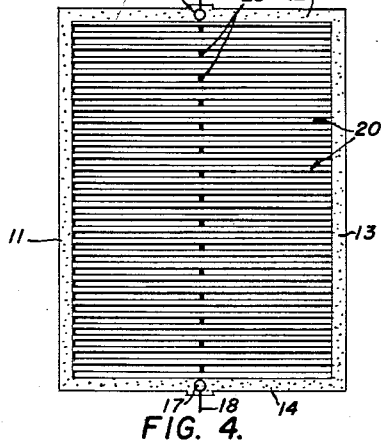
FIGURE 4 is a plan view of the invention and appurtenant structures illustrated in FIGURES 1, 2 and 3.

In the drawing, a shallow pit 10 is defined by peripheral concrete beams 11, 12, 13 and 14 poured flush with the surface of the ground 15. Terminal fence posts 16 and 17 (FIGURE 4) are centrally embedded in side beams 12 and 14 of the pit 10 and carry strands 18 of a fence at opposite sides of the pit. It is to be understood that end beams 11 and 13 of the pit 10 extend across an access roadway and are disposed perpendicularly to the centerline of the same. A plurality of laterally disposed supporting members 19, shown constructed of rail stock, are regularly spaced from one another, and each supporting member extends between and is embedded in the side beams 12 and 14 at opposite ends of the pit 10 with its principal axis parallel with the end beams 11 and 13. The upper extremity of each supporting member 19 is positioned below ground level and the upper extremities of all base support members define a plane beneath but parallel with the ground level. A plurality of steel angle beams 20 are positioned upon and secured to the base supporting members 19 and are disposed perpendicularly thereto with the web 21 of each angle beam erect. The angle beams 20 are arranged in opposed pairs, each angle beam having an adjacent angle beam positioned so that flanged portions 22 of the two beams of each pair are directed toward one another at the tops of the webs 21. The spacing between individual angle beams 20 and between next adjacent pairs of angle beams is small as compared to the width of an automobile tire.

Near the longitudinal center of each angle beam 20 an opening is provided through its web 21 to receive and support a shaft 23 which passes through each of the angle beams and which is spaced above and equidistantly from two next adjacent supporting members 19. The shaft 23 is preferably of tubular construction and extends across the pit 10 from the base of one of the terminal posts 16 to the base of the other terminal post 17. At its intersection with each of the angle beams 20 the shaft may be welded or otherwise attached to the web 21 of each angle beam to insure rigid alignment of and spacing between the angle beams at the center of the pit.

A plurality of counterweight blocks 24 are journaled to the shaft 23, it being understood that one counterweight block is positioned between each pair of angle beams 20. All of the counterweight blocks 24 are of identical construction and each is journaled to the shaft 23 at a position such that its center of gravity is below the shaft and corresponding lower ends of the counterweight blocks are directed toward the base of the pit 10. In the illustrated form of construction, each of the counterweight blocks 24 has its upper portion bifurcated along a plane which passes through the axis of its journaled mounting to the shaft 23 and through its center of gravity therebeneath. Forward and rear upper edges 25 and 26 of each counterweight block 24 are shouldered and screws 27 passing through opposite members of the upper ends of the counterweight blocks threadedly engage and urge the bifurcated portions toward one another.

A plurality of elongate pickets 28, each preferably constructed as a strip of spring steel, are respective positioned between and frictionally engaged by opposite members of the bifurcated counterweight blocks 24 above the shaft 23. Each picket projects upwardly between and beyond opposed inner edges of the flanges 22 of a pair of angle beams 20.

Figures 2, 3:
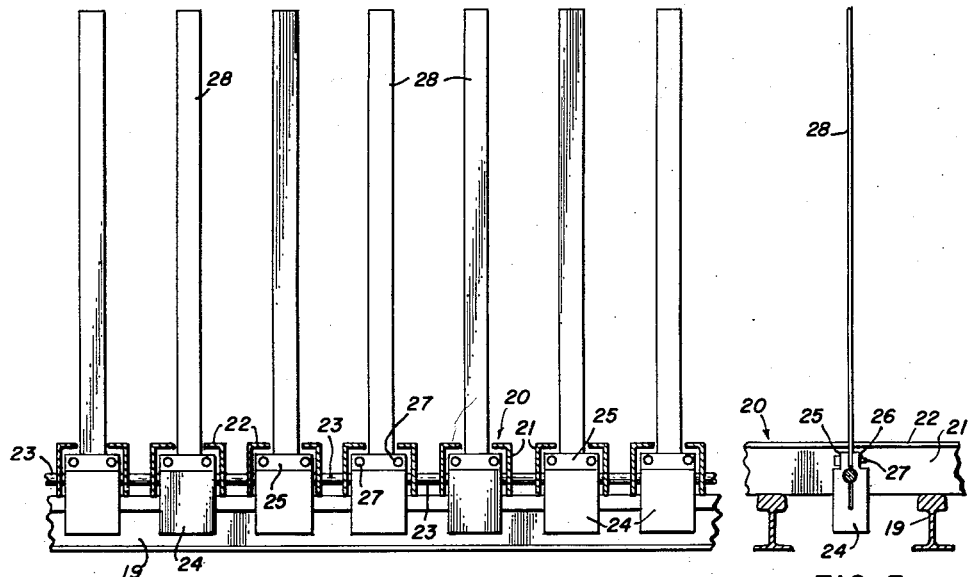
FIGURE 2 is a broken front elevational view of a preferred form of the invention.
FIGURE 3 is a broken side elevational view of the embodiment of the invention illustrated in FIGURE 2.
Figure 1:
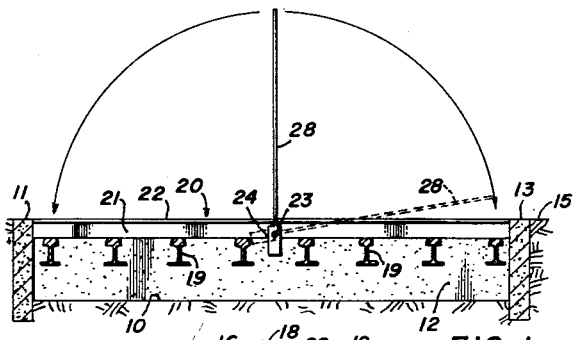
FIGURE 1 is a sectional and side elevational view of a gate as defined herein.
Figure 5:
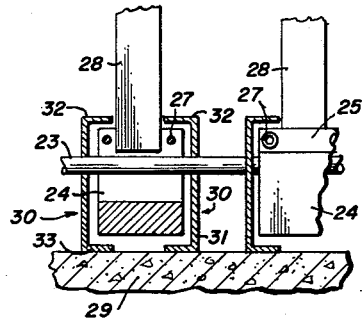
FIGURE 5 is an enlarged broken and partially sectional front elevational view of an alternate construction of the invention.

In an alternate form of construction, as illustrated in FIGURE 5, the bottom of the pit 10 is formed as a concrete slab 29 and a plurality of channel beams 30 extending parallel with the roadway are disposed in the pit with their webs 31 erect and are arranged in pairs having upper and lower flanges 32 and 33 of each pair of channel beams directed toward but spaced from one another. The lower flange 33 of each channel beam 30 rests upon and is anchored to the slab 29 at the base of the pit 10, and the upper flanges 32 lie in the plane of the upper edges of the perimeter beams 11, 12, 13 and 14 of the pit. As in the preferred embodiment of the invention, a shaft 23 passes through the webs 31 of the channel beams 30 pivotally supports a plurality of counterweight blocks 24 each of which carries a picket 28 projecting upwardly between the upper flanges 32 of a pair of channel beams 30.

In operation, the pickets 28 normally project upwardly between the flanges of the angle beams 20 and form a series of aligned barriers between the terminal fence posts 16 and 17. An automobile passing between the posts 16 and 17 is supported by the flanges 22 of the angle beams 21 which, by their spacing, serve the function of a conventional cattle guard. As the front bumper of an automobile impinges upon several of the pickets 28, they are pivoted about the shaft 23 and the counterweight block 24 is angularly displaced about its journaled mounting on the shaft beneath the roadway defined by the flanges 22 of the angle beams 20. If a counterweight block 24 is rotated as much as 90°, no part of its body extends above the flanges 22 and its picket 28 is likewise positioned entirely beneath the roadway. It should be particularly noted that each of the pickets 28 is independently mounted on the shaft 23; hence, only those pickets actually contacted are depressed. As an automobile proceeds over the pickets 28, the counterweight blocks 24 urge them back toward a vertical position and the projecting ends of the various depressed pickets contact the underside of the automobile. Since the pickets 28 are independently suspended, however, the upward pressure exerted by each picket is determined by the effective balance of its counterweight block 24 and cumulative forces of all the pickets are never exerted at any one point. The absence of a cross member common to all pickets (as is found in the conventional type gate) obviates the possibility that the invention might catch upon some part of the underside of the automobile.

The invention is not limited to the exemplary construction herein shown and described, but may be made in various ways within the scope of the appended claims.

What is claimed is:

1. A gate comprising: a roadway including a pit therein, a plurality of beams extending across said pit in alignment with said roadway, a shaft extending across said pit perpendicularly to said beams at a level beneath the surface of said roadway, a plurality of counterweight members respectively journaled to said shaft between said beams and having their centers of gravity beneath said shaft, and a plurality of pickets of spring material respectively attached to said counterweight members and projecting therefrom opposite said centers of gravity of said counterweight members with respect to said shaft.

2. A gate comprising: a roadway including a rectangular pit therein, concrete beams supported by the ground and defining the perimeter of said pit, a plurality of supporting members embedded at their opposite ends in said concrete beams and extending horizontally across said pit at a level beneath the grade of said roadway and perpendicularly to the centerline of said roadway, a plurality of angle beams perpendicularly attached to and supported by said supporting members and having flanged portions in coplanar relationship with the grade of said roadway, a shaft extending across said roadway perpendicularly to said angle beams at a level beneath the grade of said roadway, a plurality of counterweight members respectively positioned between said angle beams and pivotally connected to said shaft with their centers of gravity beneath said shaft, and a plurality of pickets projecting vertically from said counterweight members between said angle beams, the width of said counterweights being greater than the distance between adjacent said angle beams.

References Cited in the file of this patent

UNITED STATES PATENTS

| | | |
|---|---|---|
| 861,559 | Trost | July 30, 1907 |
| 1,175,965 | Lovelis | Mar. 21, 1916 |
| 1,605,485 | Thompson | Nov. 2, 1926 |
| 2,543,893 | Chandler | Mar. 6, 1951 |